June 16, 1931. G. H. HUFFERD 1,809,971
DUST COVER FOR TIE RODS OR THE LIKE
Filed Dec. 19, 1925
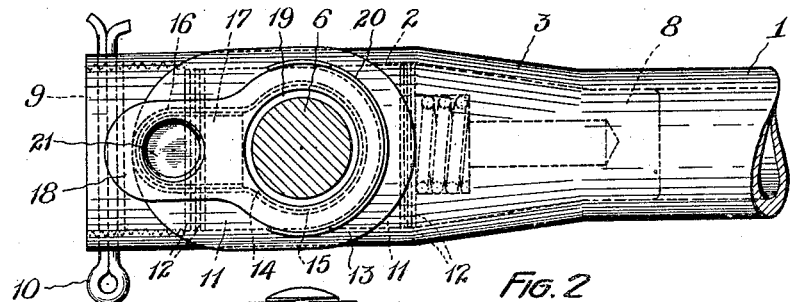
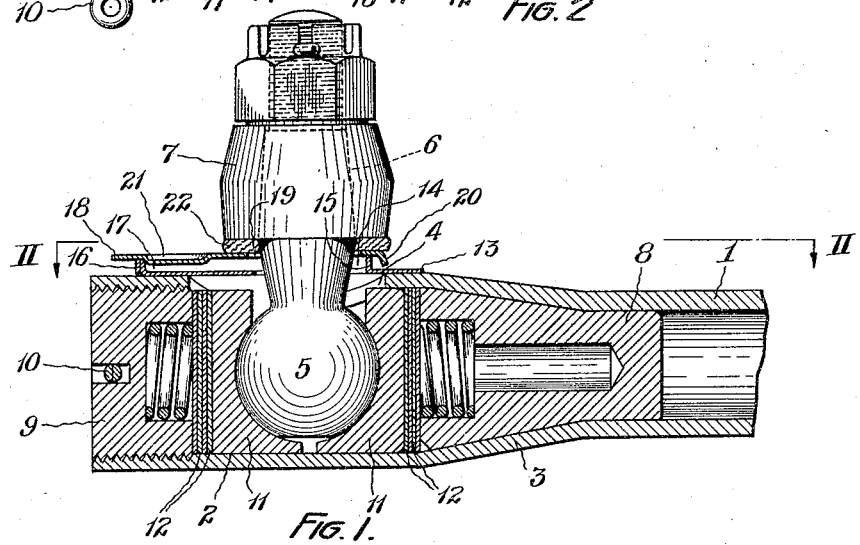
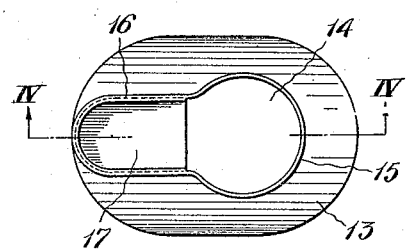 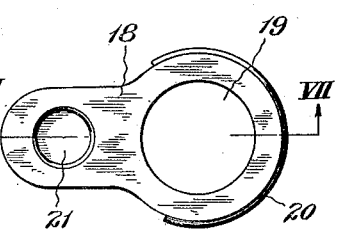
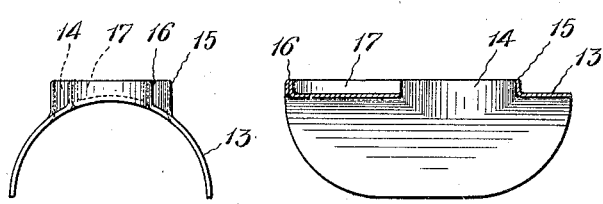 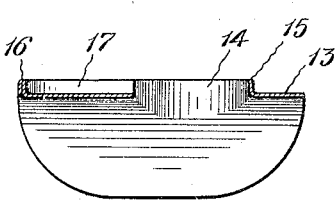 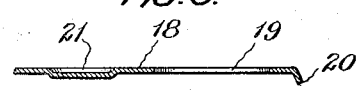
INVENTOR:
GEORGE H. HUFFERD
BY
ATTORNEY Patented June 16, 1931

1,809,971

UNITED STATES PATENT OFFICE

GEORGE H. HUFFERD, OF DETROIT, MICHIGAN, ASSIGNOR TO THOMPSON PRODUCTS INC., OF CLEVELAND, OHIO, A CORPORATION OF OHIO

DUST COVER FOR TIE-RODS OR THE LIKE

Application filed December 19, 1925. Serial No. 76,454.

The invention relates to rod couplings, such as are used in automobile tie rods and drag links and like situations which employ a universal joint including a ball stud consisting of a ball and a shank extending therefrom, and more particularly to provisions for preventing the entrance of dust and dirt into the joint and for conveniently oiling the same. In the particular type of joint to which my invention is applicable the end of the rod is provided with a cavity forming a ball housing, in a wall of which an opening is formed, through which is adapted to pass the ball or bearing part of a ball stud, the shank of the ball stud extending outwardly through the opening. The ball forms the greater portion of a sphere by reason of which there is formed a reduced or neck portion between the ball and the upper part of the shank. The ball is seated between wear-resisting ball seats. In such a construction the upper side of the bearing is exposed to the entrance of dust and dirt.

It is the object of my invention to effect the closure of such exposed bearing and at the same time provide for the introduction of lubricating oil at such point, by very simple means.

My invention consists of the novel construction and arrangement hereinafter described and illustrated in the drawings. The invention is capable of embodiment in various forms and combinations, but the best form which I have thus far contemplated is shown in the annexed drawings and which I shall now proceed to describe.

Referring to the annexed drawings:

Figure 1 is a vertical longitudinal section through the end of a tie rod and the ball joint mounted therein:

Fig. 2 is a sectional plan view through line II—II of Fig. 1;

Fig. 3 is a plan view of the cover plate;

Fig. 4 is a vertical section through the cover plate on line IV—IV of Fig. 3;

Fig. 5 is an end view of the cover plate;

Fig. 6 is a plan view of the dust shield;

Fig. 7 is a vertical section through the shield on line VII—VII of Fig. 6.

Referring to the drawings in detail, a tie rod 1 of tubular form in the embodiment shown, has, at its outer end, an enlarged cavity 2, connected to the main portion of the rod 1 by an integral inclined wall 3. In a wall of this cavity is formed an opening 4, of a size to admit the ball 5 of a ball stud, the shank 6 of which extends upwardly through the opening 4 and is adapted to form a bearing surface for an apertured arm 7 which forms a part of the member to be connected to the rod 1, such as the steering knuckle of an automobile.

Seated in the rod 1 is an abutment 8 which forms the inner wall of a ball joint housing. The outer end of the cavity 2 is closed by a retaining plug 9, engaged with the end of the rod 1 by means of external threads which take into internal threads at the end of the rod. The retaining plug is held in any desired adjusted position by any suitable means, in the embodiment shown by a cotter pin 10. Seated between the inner faces, respectively, of the abutment 8 and the retaining plug 9, are wear-resisting ball seats 11 having spherical segmental bearing surfaces to engage the ball of the ball stud. The bases or outer surfaces of the ball studs are plain and are arranged in planes parallel, respectively, to the inner faces of the abutment 8 and the retaining plug 9. The abutment 8 and the retaining plug 9 are each provided with recesses which serve to house coil springs or other resilient means, acting to press the ball seats into engagement with the ball of the ball stud, whereby any looseness in the joint due to wear is automatically taken up, and rattling of the joint is prevented.

In virtue of the parallel relation between the bases of the ball seats and the adjacent surfaces of the abutment and retaining plug, shims 12 are adapted to be inserted between such parts, at any time, either to provide for adjustment of the distance between centers of the ball studs or to take up excessive wear in the joint.

While the rod coupling above described is believed to be novel, I do not claim the same herein, the same forming the subject-matter of a separate application. But I have described the same in order to show an application of the dust cover and oiler which forms the subject-matter hereinafter claimed. The dust cover and oiler will now be described.

It may be observed that unless the opening 4, in a rod coupling, such as has been described, were protected by a cover, dust and dirt might easily enter the joint and interfere with its proper operation. To properly protect the bearing surfaces I therefore provide a cover plate 13, which is shaped to conform to the surface of the rod surrounding the opening. This plate is provided with an opening 14 adapted to surround the shank 6 of the ball stud. Projecting upwardly from the surface of the cover plate about the opening is a continuous rib 15 which is extended laterally at one side as indicated at 16 to form an oil conveying recess 17. Mounted upon this cover plate is a dust shield 18 shown in detail in Figs. 6 and 7, consisting of a resilient plate having a ball stud shank receiving opening 19 and a marginal circular segmental flange 20 at one end and an indentation 21 near the other end. The indentation is formed by stamping out a small portion of the plate. This shield is preferably of a form and dimensions slightly to overlap the rib 15 of the cover plate.

Between the dust shield 18 and the connected part 7 there is interposed a washer 22 made of felt, cork, or other yielding material.

When the cover plate 13, dust shield 18 and washer 22 are assembled as indicated in Fig. 1, the opening 4 in the ball joint housing is effectively covered to prevent the entrance of dust and dirt, yet the dust shield may be manipulated to permit the introduction of oil to the ball joint. This may be done by grasping the small end of the dust shield, slightly lifting it, and introducing the oil into the oil conveying recess 17 of the cover plate. This operation is permitted by the flexible character of the plate and the resilient washer 22. When the dust shield is released it returns immediately to its former position in which the shoulder formed at the outer margin of the indentation 21 engages the rib 16, and the marginal flange 20 of the shield surrounds the circular segmental rib 15.

From the above description it will be seen that I have provided a very simple and effective means for covering the opening at the upper end of a ball joint, such as that disclosed herein, and at the same time permitting effective lubrication of the joint at this point.

While I have described specific details of the best form of the invention now known to me, it is obvious that the parts may be varied greatly in structure and that different features thereof may be used with other features which may differ greatly from those shown. It is therefore to be understood that the invention includes all structures comprehended within the terms of the appended claims.

What I claim is:

1. As an article of manufacture designed to form part of a dust cover and oiler for ball joints, a cover plate provided with a ball stud shank receiving opening and having a continuous rib around the margin of the opening except at one side where it is extended laterally to provide an oil conveying recess.

2. An article of manufacture designed to to form part of a dust cover and oiler for ball joints, comprising a dust shield consisting of a flexible apertured plate having an arcuate segmental flange spaced from the aperture at one end and an indentation at the other end.

3. In a rod coupling comprising a ball joint housing with a ball stud receiving opening in its wall and a ball stud in the housing with its shank extended through said opening, in combination, a dust cover and oiler therefor comprising a cover plate formed to fit the contour of the housing and provided with a ball stud shank receiving opening and a lubricant receiving trough leading to said opening, and a flexible dust shield fitted over said cover plate and provided with a portion covering said lubricant receiving trough in said cover and adapted to be flexed upwardly to introduce oil into said lubricant receiving trough.

4. In combination in a coupling, a first coupling member including an opening, a second coupling member extending into said opening and journalled therein, a combination cover and oiler fitted over said first member and having an opening through which said second member extends, said cover having a lubricant receiving trough disposed to one side of said second member and leading to the opening in said cover, and a dust shield including an opening through which said second member extends, and a portion covering said lubricant receiving trough and cover, said portion being movable away from said cover for introducing oil into said lubricant receiving trough.

5. In combination in a coupling, a first coupling member including an opening, a second coupling member extending into said opening and journalled therein, a combination cover and oiler fitted over said first member and having an opening through which said second member extends, said cover having a lubricant receiving trough disposed to one side of said second member and leading to the opening in said cover, a dust shield including an opening through which said second member extends, and a lateral portion covering said lubricant receiving trough and cover, said portion being movable away from said cover for introducing oil into said lubricant receiving trough, an element connected to said second coupling member; and means encircling said coupling member between said element and said shield for urging said shield into tight cooperation with said cover.

6. In a ball joint coupling comprising a housing having a ball receiving opening in a wall thereof and a ball stud in the housing with its shank extended through said opening, in combination a dust cover and oiler therefor comprising a plate shaped to the contour of the housing and having a ball shank receiving opening therein, an upwardly extending continuous rib on said plate surrounding the opening in the housing for the greater length of the periphery of said opening said rib having a portion extending laterally from said opening to define a trough leading to said opening and an apertured dust shield over said cover plate having means thereon to position the shield with respect to said plate.

7. A device as in claim 6 wherein the means on the dust shield for positioning the same on the dust cover consist of a downwardly extending segmental flange at that end of the shield adjacent the cover opening cooperating with the rib on said dust cover and an indentation adjacent the opposite end of said shield received in said trough.

8. In a coupling, comprising a housing having an opening in a wall thereof and a ball stud positioned in said housing with its shank extending through said opening, in combination, a dust cover and oiler therefor comprising a cover having an opening to receive said stud shank, a continuous flange extending upwardly from said cover and defining on said cover a space substantially pear shaped in cross section, the portion of the flange at the larger end of said space encircling the opening in the cover for the greater part of its periphery, the portion of the flange at the smaller end of said space forming an oil trough leading to the opening in said cover, and an apertured dust shield having a contour similar to that of said flange clamped on said cover, said dust shield being provided with a downwardly extending segmental flange encircling, but spaced from the flange about the cover opening and an indentation fitting into the lower end of the oil trough to position the shield on said cover.

9. A dust cover for a tie rod coupling comprising a U shaped spring plate adapted to be clamped to a coupling housing, said plate having an opening in the bottom wall of the U to receive a stud shank of said coupling, an upwardly extending continuous rib on the outer surface of said plate defining a space simulating the cross section of a pear, that portion of the flange at the larger end of said space encircling the cover opening for the greater part of the periphery of said opening and that portion of the flange at the smaller part of said space coacting with a portion of the bottom wall of the U plate to form an oil trough leading to said cover opening.

10. A dust cover and oiler for ball joints, comprising a cover plate provided with an opening and having a continuous rib around the margin of the opening except at one side where it is extended laterally to provide an oil conveying recess, in combination with a flexible plate superimposed upon said cover plate and having an opening therein aligned with the opening in said cover plate, an arcuate flange cooperating with said rib and an indented portion received in said recess.

Signed by me this 25th day of November, 1925.

GEORGE H. HUFFERD.